Figure 1:
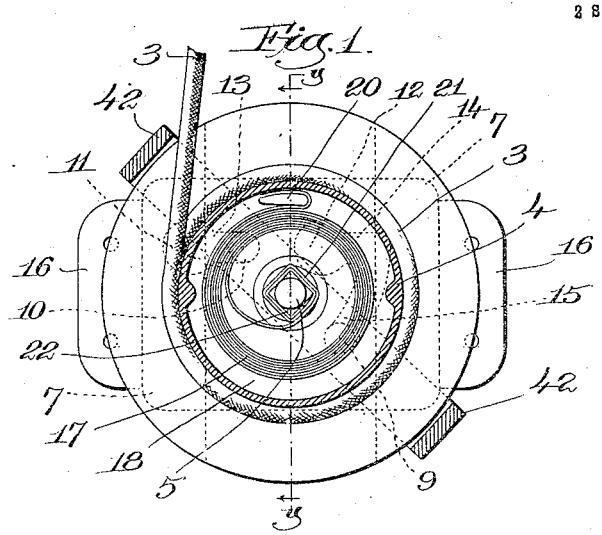

F. J. ROCHE.
TROLLEY CATCHER.
APPLICATION FILED NOV. 18, 1909.

977,476.

Patented Dec. 6, 1910.

2 SHEETS—SHEET 1.

Witnesses:
Thomas J. Drummond
Joseph M. Ward

Inventor
Francis J. Roche,
by Crosby & Gregory Attys.

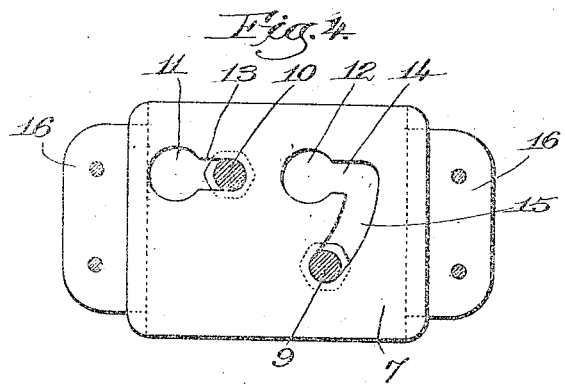
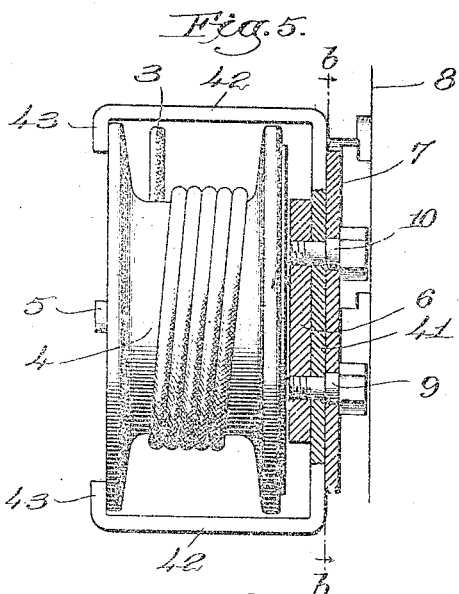
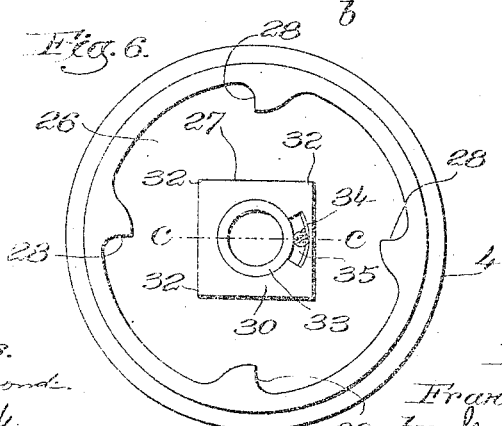
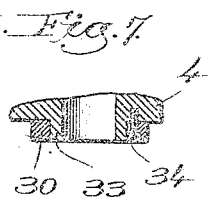

UNITED STATES PATENT OFFICE.

FRANCIS J. ROCHE, OF SOMERVILLE, MASSACHUSETTS.

TROLLEY-CATCHER.

977,476.

Specification of Letters Patent. Patented Dec. 6, 1910.

Application filed November 18, 1909. Serial No. 528,644.

*To all whom it may concern:*

Be it known that I, FRANCIS J. ROCHE, a citizen of the United States, residing at Somerville, county of Middlesex, and State of Massachusetts, have invented an Improvement in Trolley-Catchers, of which the following description, in connection with the accompanying drawing, is a specification, like characters on the drawing representing like parts.

This invention relates to trolley catchers such as are used on the back ends of trolley cars for securing the trolley rope to and for preventing said rope from paying out whenever the trolley jumps the wire.

The object of the invention is to provide a novel trolley catcher which is comparatively simple in construction and has no parts that are likely to become damaged or get out of order and which is arranged so that it can be made more or less sensitive as desired.

With these objects in view the invention consists in the apparatus which will be more fully hereinafter described and then the novel features of which will be pointed out in the appended claims.

Figure 2:
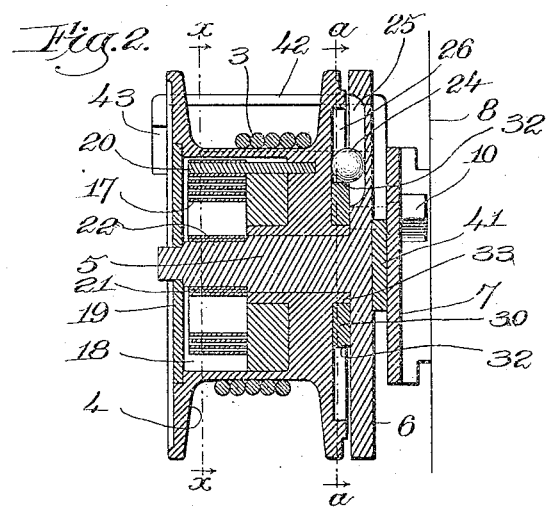
Figure 3:
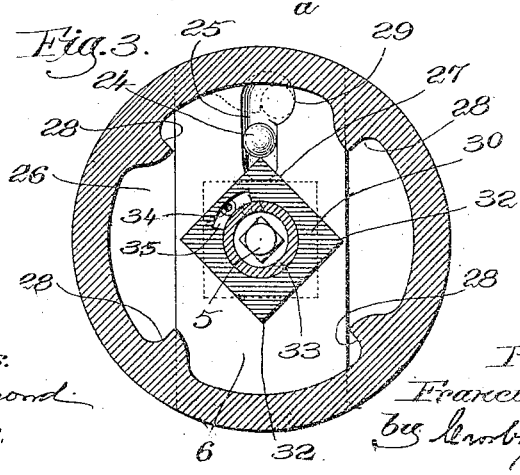

Referring to the drawings wherein I have shown one embodiment of my invention, Figure 1 is a sectional view on substantially the line $x-x$, Fig. 2; Fig. 2 is a section on substantially the line $y-y$, Fig. 1; Fig. 3 is a section on substantially the line $a-a$, Fig. 2; Fig. 4 is a section on the line $b-b$, Fig. 5; Fig. 5 is a side view of the trolley catcher with a part broken out; Fig. 6 is a view of the inner end of the drum; Fig. 7 is a section on the line $c-c$, Fig. 6.

The trolley rope 3 is wound on a drum 4 which is rotatably supported on a stud 5 that extends from a backing plate 6. This backing plate is removably sustained by a bracket or holder 7 that is permanently attached to the end of the car 8, so that the backing plate and the drum can be readily removed from the bracket. While it is within my invention to secure the backing plate to the bracket in a variety of ways, I prefer that herein shown because of its simplicity and because there is practically no liability that the backing plate will become accidentally detached from the bracket. The backing plate is shown as having extending therefrom two headed studs 9 and 10 and the bracket 7 is provided with two apertures 11 and 12 that are adapted to receive said studs. Each aperture has extending therefrom a slot, said slots being designated 13 and 14 respectively, and the slot 13 is a comparatively short slot extending laterally, while the slot 14 has the short laterally-extending portion and then another portion 15 which extends downwardly and is on the arc of a circle struck from the end of the slot 13. The bracket is provided with the feet 16 which are offset from the body and through which pass the screws, bolts or other fastening means that secure the bracket to the car body. The body of the bracket having the slots therein is, therefore, spaced from the car body a sufficient distance to receive the heads of the studs 9 and 10, as clearly indicated in Figs. 2, 4 and 5. To secure the backing plate to the bracket the heads of the studs are first inserted through the apertures 11 and 12, and then the backing plate is moved laterally until the stud 10 reaches the end of the slot 13 and thereafter the backing plate is turned so as to bring the stud 9 down to the lower end of the portion 15 of the slot, as shown.

The trolley rope 3 is wound on the drum in such a direction that the pull of the rope on the drum will tend to turn the drum clock-wise in Fig. 1 so that the strain on the trolley rope will serve to keep the studs in the position shown in Fig. 4, and so long as said studs are in this position any accidental removal of the backing plate from the bracket is prevented.

The drum 4 is acted on by a spring as usual in devices of this character which tends to wind the drum up, and thus keep the trolley rope taut. This spring is designated by 17 and it is housed within the recess 18 formed in the drum, this recess being normally closed by the plate 19 which is detachably secured to the drum. One end of the spring is secured to a pin 20 that is rigidly carried by the drum, and the other end of said spring is secured to the stud 5, so that when wound up said spring will tend to turn the drum in a direction to wind the trolley rope thereon.

If the trolley rope should break suddenly the tension of the spring would rotate the drum rapidly until the spring was completely unwound and when this happens and the spring does become completely unwound, the inertia of the drum is very apt to subject the unwound spring to such a strain that the connection between the spring and its anchor will be broken. In fact this occurs more or less frequently under actual working conditions. When the spring does thus become broken it is necessary to remove the trolley catcher and to place a new spring therein, a proceeding which involves more or less delay and annoyance. In order to avoid this I have provided a yielding connection between the spring and the stud so that when the trolley rope accidentally breaks and the spring unwinds itself rapidly to its full limit, the connection between the spring and the stud will yield at the time that the spring becomes unwound thus preventing any breakage of the parts. This yielding connection can conveniently be made by bending the end of the spring into a loop 21 which embraces the non-circular portion 22 of the stud 5, said loop 21 being shaped to fit the non-circular portion. While the loop 21 will grip the non-circular portion 22 sufficiently so that during ordinary use the end of the spring will be properly anchored, yet in case of the accident above referred to the loop is permitted to slip around on the stud, thus preventing any breakage of the parts.

Referring to Fig. 1 it will be seen that when the spring is fully unwound any further backward rotation of the drum will tend to open up the loop 21 and thus cause it to loosen its grip on the stud while a forward rotation of the drum, such as is necessary to wind the spring up, will tend to tighten the grip of the spring on the stud.

The lock which operates to lock the drum from rotation whenever it is rotated with a quick movement is situated between the drum and the backing plate 6 and such lock comprises a ball 24 which is partially received in a groove 25 formed in the backing plate and is partially received in an annular recess 26 formed in the end of the drum. The drum has associated therewith a cam surface 27 on which the ball 24 normally rests and which is provided with throw-points 32, and said drum also is formed with one or more teeth 28 situated near its periphery. The groove 25 is formed with the offset portion 29. The cam surface 27 may have a variety of shapes without departing from the invention, but I prefer to make it with as many throw-points 32 as there are teeth 28. One convenient form of cam is that presented by a square sided block 30, such as shown in Figs. 3 and 6. It will be understood that the ball is at all times located in the groove 25 or its offset portion 29 and that since the recess 26 is an annular one and comprises the space between the cam member 30 and the rim of the drum, as clearly seen in Figs. 3 and 6, said ball does not interfere in any way with the rotation of the drum so long as the ball rests on the cam surface 27. So long as the drum rotates slowly, the ball will merely have a rising and falling movement in the groove 25 due to its rolling over the cam surface 27. The cam block 30 is so situated, however, that the throw-points 32 are located midway between the teeth 28, and therefore so long as the drum is rotating slowly the ball 24 will merely have a rising and falling movement but will not be engaged by the teeth 28. If, however, the drum is rotated rapidly the rapid movement of the throw-points 32 of the cam-block will throw the ball to the upper end of the slot 25, and owing to the rapid movement of the drum one of the teeth 28 will come into engagement with the ball before the latter can drop down again. The ball will, therefore, be caught in the pocket 29 by one of the teeth, as shown in dotted lines, Fig. 3, and the drum will thus be locked from further rotation. The device can be made more or less sensitive, that is, can be made to lock at different speeds of rotation of the drum by adjusting the position of the throw-points 32 relative to the teeth 28 and to provide for this adjustment I adjustably mount the cam-block 30 on the hub 33 of the drum so that said cam-block can be turned slightly on the hub to bring the throw-points 32 nearer to or farther from the teeth 28. This cam-block may be locked in its adjusted position by means of a clamping screw 34 which extends down through a slot 35 formed in the cam-block and into the drum 4.

The drum is held on the stud by means of a retainer 41 which is herein shown as a bar secured to the backing plate 6 and provided with arms 42 that extend laterally and are provided at their ends with lips 43 that embrace the edge of the drum.

Having fully described my invention, what I claim as new and desire to secure by Letters Patent is: —

1. In a trolley catcher, the combination with a spring-actuated drum to receive the trolley rope, of a fixed plate having a groove, a freely-movable locking member which is confined in the groove but projects beyond the latter, means associated with the drum to cause the locking member to move a greater or less distance longitudinally of the groove as the drum turns, that depending on the speed of rotation of the drum and a shoulder carried by the drum and adapted to pass over a portion of the groove as the drum turns.

2. In a trolley catcher, the combination with a spring-actuated drum to receive the trolley rope, of a fixed plate having a groove, a freely-movable locking member which is confined in the groove but projects beyond the latter, a cam associated with the drum to cause the locking member to move outwardly in the groove as the drum turns, and a shoulder carried by the drum and adapted to pass over the outer portion of the groove as the drum turns.

3. In a trolley catcher, the combination with a spring-actuated drum to receive the trolley rope, of a fixed plate having a vertically-arranged groove, a freely-movable locking member which is confined in the groove but projects beyond the latter, and a cam rotating with the drum and adapted to move the locking member upwardly in the groove, said drum having a shoulder which passes over the upper portion of the groove as the drum turns.

4. In a trolley catcher, the combination with a spring-actuated drum to receive a trolley rope, of a fixed plate having a vertically-arranged groove which terminates at its upper end in an offset, a ball freely movable in said groove but projecting beyond the latter, and a cam secured to the drum and adapted to throw the ball upwardly in the groove when the drum rotates rapidly, said drum having a shoulder which passes over the offset portion of the groove as the drum turns whereby when the ball is thrown to the outer end of the groove the shoulder will engage said ball and thereby lock the drum from further rotation.

5. In a trolley catcher, the combination with a spring-actuated drum to receive a trolley rope, of a fixed plate having a vertically-arranged groove which terminates at its upper end in an offset, a ball freely movable in said groove but projecting beyond the latter, and a cam adjustably secured to the drum and adapted to throw the ball upwardly in the groove when the drum rotates rapidly, said drum having a shoulder which passes over the offset portion of the groove as the drum turns whereby when the ball is thrown to the outer end of the groove the shoulder will engage said ball and thereby lock the drum from further rotation.

6. In a trolley catcher, the combination with a spring-actuated drum to receive a trolley rope, of a fixed plate having a vertically-arranged groove terminating at its outer end in an offset, a ball confined in the groove but projecting beyond the latter, and a cam having a plurality of throw-points secured to the drum and adapted to move the ball outwardly as the drum rotates, said drum having a plurality of shoulders or teeth situated in the plane of the cam and adapted to pass over the offset portion of the groove as the drum rotates.

7. In a trolley catcher, the combination with a drum to receive a trolley rope, of a backing plate having a stud on which the drum is rotatably mounted, and a spring situated within the drum and secured at one end thereto, the stud having a polygonal portion and the other end of the spring being bent into a loop which fits the shape of the stud whereby when the spring winds up the loop will grip the stud, but when the spring unwinds beyond a certain point the loop will slip about the stud.

8. In a trolley catcher, the combination with a spring-actuated drum, of a backing plate having a stud on which said drum is rotatably mounted, a bracket for supporting the backing plate and provided with two apertures from each of which extends a slot, one of said slots being longer than the other and having an angularly-arranged offset portion, and headed studs carried by the backing plate and adapted to be received in said slots.

9. In a trolley catcher, the combination with a spring-actuated drum, of a backing plate having a stud on which the drum is rotatably mounted, and a retainer secured to the backing plate and provided with arms which are bent at their ends to form lips which overlie the face of the drum.

10. In a trolley catcher, the combination with a spring-actuated drum, of a non-rotatable member having a groove, a locking member located in the groove and freely movable longitudinally thereof, said member projecting slightly beyond the groove, said drum having a shoulder which is carried over a portion of the groove as the drum turns, and means carried by the drum to move the locking member longitudinally of the groove a greater or less distance, that depending on the speed at which the drum turns whereby when the drum turns rapidly enough the locking member will be thrown into the portion of the groove over which the shoulder passes.

In testimony whereof, I have signed my name to this specification, in the presence of two subscribing witnesses.

FRANCIS J. ROCHE.

Witnesses:
LOUIS C. SMITH,
THOMAS J. DRUMMOND.